June 4, 1929.  J. L. JOHNSTON ET AL  1,715,504
RELEASABLE VALVE
Filed Aug. 10, 1928  2 Sheets-Sheet 1

James L. Johnston, Inventor
Edgar C. Johnston
&
Blaine Johnston
By Jesse R. Stone
Their Attorney

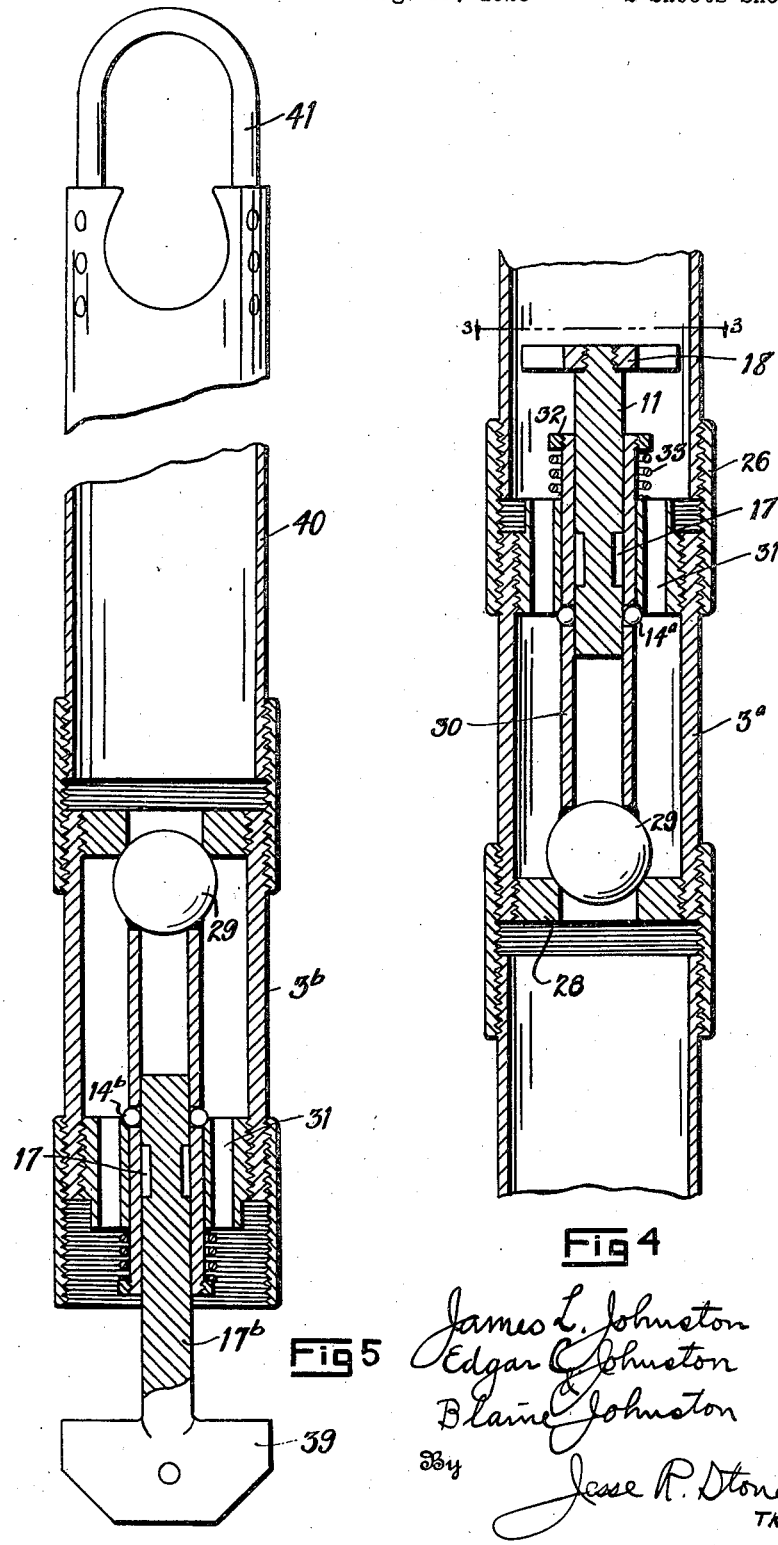

Patented June 4, 1929.

1,715,504

UNITED STATES PATENT OFFICE.

JAMES L. JOHNSTON, EDGAR C. JOHNSTON, AND BLAINE JOHNSTON, OF ELDORADO, ARKANSAS.

RELEASABLE VALVE.

Application filed August 10, 1928. Serial No. 298,818.

Our invention relates to valves generally, but more particularly to valves which may be employed for oil field work, said valves being of the type which are normally closed, but which may be released and opened while in inaccessible positions without removing the same from its position, or exposing the valve for manipulation.

It frequently happens, in oil field operations, that it is desirable to employ a valve in pipes such as drill stems, eduction pipes for conducting oil from a well, pipe line laterals, dump buckets for cement, and the like; where the valve is closed when introduced into the well, or otherwise positioned for use, but which must be capable of opening thereafter at the proper time.

It is an object of our invention to provide a valve of simple construction, which may be released from locked position after it has been introduced into the well, or after it has been placed in an inaccessible position in a pipe line.

It is desired that means be provided upon the valve to latch it firmly in closed position, but which may be positively released by means introduced into the pipe and operated through gravity or by fluid pressure, or other similar means, when the opening of the valve is desired.

It is also an object to employ means which, when the valve has been released, will automatically latch the valve in open position.

It is to be understood that the valve is capable of wide application but, in the drawings we have shown several embodiments thereof, illustrative of certain of the devices in which it may be employed.

Figure 3:
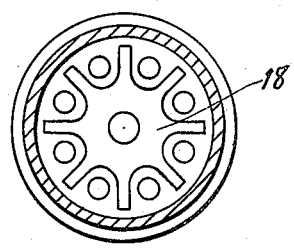
Figure 2:
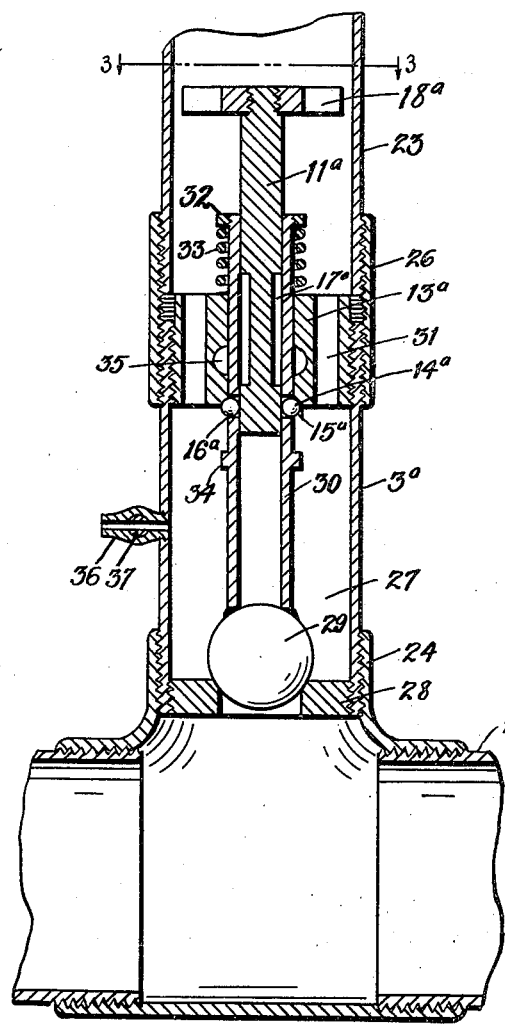
Fig. 2 shows a broken section of pipe line, with our valve shown in a lateral line connected therewith, the device being in central horizontal section.

Fig. 3 is a transverse section on the plane 3—3 of Fig. 2. Fig. 4 is a central longitudinal section through a valve embodying our invention, this form being similar to the Fig. 2 embodiment. Fig. 5 is a longitudinal section through a dump bucket employing the invention shown in Fig. 4.

Figure 1:
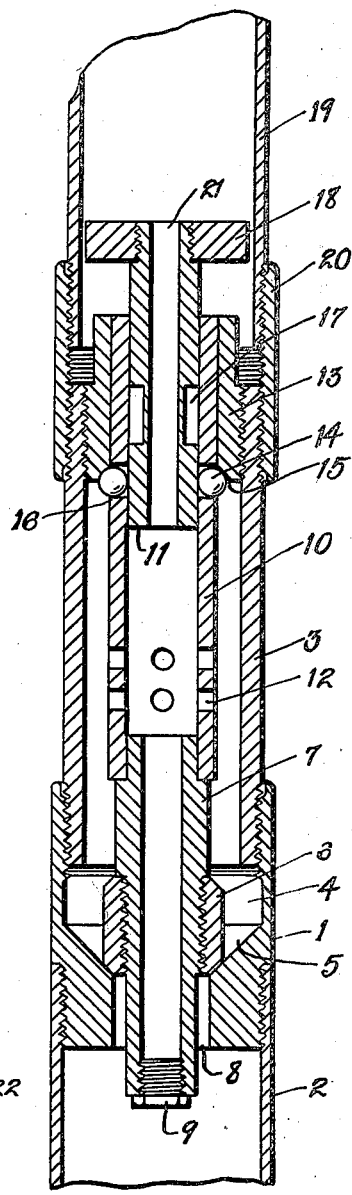
Fig. 1 is a central vertical section of a valve in a fluid line adapted for well work.

In Fig. 1 an embodiment of the invention is shown which may be employed in a casing or other pipe when said pipe is introduced into the well; as for example, when a casing is floated into the well to take the weight off the line. It is, however, adapted for various similar uses. In this structure there is a lower valve casing 1 threaded at its lower end to connect with a pipe or shoe 2, projecting in advance of the valve. The upper end of the casing is threaded internally to connect with a barrel or housing 3. On the inner part of the casing 1 is a chamber 4, below which the walls of the casing are thickened and provided with a downwardly tapered seat 5, to receive the valve 6. Below the valve seat the passage 7 leads through to the pipe 2.

The valve 6 is formed by a collar or ring screwed upon a tubular stem 7. The valve is tapered at both ends to fit the seat, and may be unscrewed from the stem and reversed to accommodate for wear. The lower end of the stem 8 is threaded to receive a plug 9, closing the same.

The upper end of the stem 7 is secured to a cylinder 10, which forms an extension thereon; the interior of the cylinder being formed to receive a releasing plunger 11.

The said cylinder is provided with a series of openings 12 above the stem 7, and its upper end is extended to fit within a stop collar 13. The said collar is screwed within the upper end of the barrel 3, and the lower end thereof is formed with an inclined shoulder 14 which acts as a stop for the latching balls 15.

The balls 15 are set in openings 16 in the cylinder 10 at a level spaced from the upper end of the cylinder. They are held in position, projecting through these openings against the shoulder 14 by the plunger 11. Said plunger fits closely within the cylinder, and has a frictional fit therein. It is adapted to slide in the cylinder, however, when force is applied to the upper end thereof. Intermediate the ends of the plunger is an annular groove 17, said groove being adapted to receive the balls 15 and, as will be noted, the groove is materially wider than the balls. The upper end of the plunger has a top plate or disc 18 which may be screwed on the reduced upper end of the plunger.

The barrel 3 is connected to the main line of the casing 19 by means of a coupling 20.

When this device is employed as a valve for floating casing into the well, it is assembled as shown in Fig. 1. The balls 15 are placed in proper position and the hold-down collar 13 is adjusted into position to hold the valve 6 firmly in its seat. In this position it is introduced into the well and will serve to prevent fluid from entering the lower end of the pipe. When it is desired to release this valve to allow fluid to enter the casing a heavy object such as a pipe coupling or a heavy ball valve may be dropped from the surface downwardly through the casing 19, striking a blow upon the plunger plate 18. This will drive the plunger downwardly in the cylinder 10 bringing the groove 17 in the plunger opposite the balls 14, allowing the balls to move from their position against the shoulder 14 and thereby releasing the cylinder 10 and the valve so that the fluid pressure from below the valve may raise it from its seat. The fluid from below will then pass into the valve chamber 4 and upwardly through the openings 12 to the interior of the cylinder 10. It may then flow upwardly through a central passage 21 in the plunger to the interior of the casing.

It will be obvious that this valve may be used in this manner for other purposes than in floating casing into the well. This use of the device is given as illustrative only of one way in which it may be employed.

It may be changed slightly for use in pipe line work, and, in Figs. 2 and 3, we have shown how it may be thus used. In pipe lines, lateral connections leading to the main line are sometimes not used for a material length of time and must be closed by a valve adjacent the connection between the lateral line and the main line. It is desirable to employ a valve which is not open for manipulation from the outside, but which may be opened when the lateral is brought into use. Our valve may be employed for this purpose. In Fig. 2, the main line is indicated at 22. The lateral line 23 is connected thereto by means of a T-shaped coupling 24. A short section of pipe 3ª is employed as a casing connecting the lateral line 23 with the coupling, said line and casing being connected through the collar 26.

Within the casing 3ª is a valve chamber 27, a valve seat is formed at the inner end of the casing by means of a plate 28, having an opening therein to receive a ball valve 29.

The ball valve 29 is secured, by welding or otherwise, to the inner end of a tubular valve stem 30. Said stem is slidable within the stop collar 13ª, similar in construction to the stop collar of the previous embodiment except that it has longitudinal openings 31 therethrough, connecting the valve chamber with the line 23.

The stem 30 forms a cylinder to receive the plunger 11ª which is slidable therein and has a circumferential groove 17ª into which the latching balls 15ª may be received. Said balls are fitted within openings 16ª and bear against a shoulder 14ª which holds the valve stem and valve in closed position. The upper end of the stem 30 has a nut 32 thereon and a spring 33 bearing against said nut and the upper end of the stop collar 13ª tends to force the valve stem and valve away from the valve seat. The stem is formed with a radial flange 34, spaced from the inner side of the stop collar, to limit the movement of the stem outwardly. On the inner side of the stop collar 13ª we may provide an annular groove 35 to receive the latching balls 15ª. The outer end of the plunger has thereon a plate 18ª as in the previous embodiment. From Fig. 3 it will be noted that this plate has radial arms which allow the free passage of fluid between them.

A lateral vent 36 may be formed in the casing 25, said vent having a cock 37, whereby the flow of fluid therethrough may be controlled.

In the operations of this device, the valve will be normally closed. When it is desired to pump fluid through the pipe 23 to the main line, a loose fitting plunger or similar device may be placed in the line 23 ahead of the oil. The tap 37 will be opened to allow a vent for air ahead of the plunger. The plunger will be forced by the oil being pumped into the line, against the plate 18ª, moving the plunger 11ª inwardly until the groove 17ª receives the latching balls. The spring 33 will then throw the valve 29 into open position and the fluid will pass through the openings 31 to the pipe line. The tap 37 may then be closed.

The arrangement of the groove 35 in the stop sleeve 13ª will enable us to latch the valve in open position, the balls 15ª will enter the groove 35 by gravity and will prevent the sliding of the stem thereafter.

In Fig. 4, the Fig. 2 embodiment is shown as adapted for use in the same manner as is that shown in Fig. 1, for floating a pipe into the hole, or for similar operations. The means for latching the valve in open position is, however, omitted, it being understood that this feature of the valve may be employed wherever desirable.

In Fig. 5, the valve is adapted for use on a dump bucket such as is employed in handling cement in completing the setting of casing. Here the valve is inverted in position. The ball 29 is below the seat and the plunger 11ᵇ is formed with a dart 39 on the outer end as is usual with dump valves. The valve 3ᵇ is connected at its upper end to the bucket 40 having a bail 41.

When the device is operated, the bucket is assembled as seen in Fig. 5 with the valve closed. The bucket is filled with cement and lowered in the usual way to the bottom of the well. When the bottom is reached, the dart 39 will strike the bottom and the plunger will be moved to bring the groove 17 into registration with the latching balls allowing them to move free of the shoulder 14ᵇ so that the spring 33 will open the valve 29 allowing the cement to be dumped and the bucket withdrawn.

It will be readily understood from the examples above noted that the valve structure illustrated is adapted for various uses where the valve is inaccessible for manual control when the opening becomes desirable.

What we claim as new is:

1. A valve including a casing, a valve seat therein, a valve in said seat, a valve stem on said valve, a stop sleeve through which said stem is slidable, balls in said stem adapted to contact with said sleeve, means to release said balls and means to open said valve when said balls are released.

2. A valve including a casing, a valve seat therein, a valve member in said seat, a valve stem on said member, a stop collar through which said stem is slidable, a shoulder on the side of said stop collar adjacent said valve member, balls in said stem adapted to engage said shoulder when said valve is closed, means to hold said balls in latching position, but adapted to be moved to release said balls and said valve member.

3. A valve including a casing, a valve seat therein, a valve member in said seat, a valve stem on said member, a stop collar through which said stem is slidable, a shoulder on the side of said stop collar adjacent said valve member, means on said stem engaging said shoulder to hold said valve member in closed position, and means slidable relative to said stem to release said holding means, to allow said valve to be opened.

4. A valve including a casing, a valve seat therein, a valve member in said seat, a valve stem on said member, a stop collar through which said stem is slidable, a shoulder on the side of said stop collar adjacent said valve member, means on said stem engaging said shoulder to hold said valve member in closed position, a cylinder in said stem, a plunger in said cylinder engaging said holding means, said plunger being adapted to move responsive to a blow thereon and release said holding means.

5. A valve including a seat, a valve member in said seat, a stem on said valve member, a stop collar having a shoulder adjacent said stem, means on said stem engaging said shoulder to hold said valve member in said seat, and means slidable in said stem to release said holding means.

6. In a valve, a casing, a valve seat therein, a valve member in said seat, a valve stem on said valve, a cylinder on said stem, a plunger in said cylinder, a shoulder in said casing, means on said cylinder engaging said shoulder to hold said valve member in said seat, said means being releasable by the inward movement of said plunger.

7. In a valve, a casing, a valve seat therein, a valve member in said seat, a valve stem on said valve, a cylinder on said stem, a plunger in said cylinder, a shoulder in said casing, balls in the walls of said cylinder engaging said shoulder to hold said valve closed, means holding said balls in position engaging said shoulder, said means being slidable relative to said stem to release said balls.

8. In a valve, a casing, a valve seat therein, a valve member in said seat, a valve stem on said valve, a cylinder on said stem, a plunger in said cylinder, a shoulder in said casing, means on said cylinder engaging said shoulder to hold said valve member in said seat, said means being releasable by the inward movement of said plunger and positive means to throw said valve member into open position when said stem is released.

9. In a valve, a valve casing, a valve seat therein, a stop collar, a valve member in said seat, a valve stem slidable in said collar, means on said stem engaging said collar to hold said valve member in said seat and means responsive to pressure thereon to release said holding means.

10. In a valve, a valve casing, a valve seat therein, a stop collar, a valve member in said seat, a valve stem slidable in said collar, means on said stem engaging said collar to hold said valve member in said seat, means responsive to pressure thereon to release said holding means and means to force said valve from its seat.

11. In a valve, a valve casing, a valve seat therein, a stop collar, a valve member in said seat, a valve stem slidable in said collar, means on said stem engaging said collar to hold said valve member in said seat, means responsive to pressure thereon to release said holding means, means tending to move said valve member from its seat, and means whereby said holding means may latch said valve member in open position.

12. A valve including a casing, a seat at one end thereof, a valve member in said seat, a stem on said valve, and adjustable stop collar in which said stem is slidable, a cylinder in said stem, balls fitting in openings in the wall of said cylinder, a plunger in said cylinder adapted to force said balls into position to engage said collar and hold said valve in said seat, said plunger having recesses to receive said balls, when said plunger is moved into said cylinder and thus release said valve member.

13. A valve including a casing, a seat at one end thereof, a valve member in said seat, a stem on said valve, an adjustable stop collar in which said stem is slidable, a cylinder in said stem, balls fitting in openings in the walls of said cylinder, a plunger in said cylinder adapted to force said balls into position to engage said collar and hold said valve in said seat, said plunger having recesses to receive said balls, when said plunger is moved into said cylinder and thus release said valve member, and a spring tending to move said valve stem and valve member when said stem is released.

14. A valve releasing mechanism including in combination a plunger, a concentric sleeve surrounding said plunger, a plurality of apertures in said sleeve and movable means in said apertures, a stop collar about said sleeve, said means adapted to contact with said plunger and said collar to hold the sleeve in rigid engagement therewith.

15. A valve releasing mechanism including in combination a plunger, a concentric sleeve surrounding said plunger, a stop collar about said sleeve, and means carried by said sleeve and operable by said plunger whereby the collar is engaged or disengaged.

16. A valve stem comprising in combination a plunger, an annular cavity on said plunger, a stem, movable means carried by said stem and adapted to partially enter said cavity and a stop collar surrounding said stem to force the movable means into said cavity upon movement of said plunger.

17. A valve releasing mechanism including in combination a plunger, a concentric sleeve surrounding said plunger, a stop collar about said sleeve and means movable through said sleeve to engage or disengage said collar.

In testimony whereof we hereunto affix our signatures this 1st day of August, A. D., 1928.

JAMES L. JOHNSTON.
EDGAR C. JOHNSTON.
BLAINE JOHNSTON.